United States Patent [19]

McAllister et al.

[11] 4,326,887
[45] Apr. 27, 1982

[54] BASIC PROCESS OF PRODUCING BASIC FLUXED PELLETS FOR IRON-MAKING

[75] Inventors: John H. McAllister, Burlington; Lindsay G. Stewart, Hamilton; Carl V. Gladysz, Mount Hope; Jim Wilson, Hamilton, all of Canada

[73] Assignee: Dofasco Inc., Hamilton, Canada

[21] Appl. No.: 212,380

[22] Filed: Dec. 3, 1980

Related U.S. Application Data

[63] Continuation-in-part of Ser. No. 91,430, Nov. 5, 1979, abandoned.

[51] Int. Cl.³ .................................................. C22B 9/10
[52] U.S. Cl. ............................................ 75/257; 75/3; 75/53
[58] Field of Search ................................ 75/257, 3–5, 75/53

[56] References Cited

U.S. PATENT DOCUMENTS 3,754,889  8/1973  Dominguez .............................. 75/3

Primary Examiner—P. D. Rosenberg
Attorney, Agent, or Firm—Hirons, Rogers & Scott

[57] ABSTRACT

A new fluxed pellet for use in iron-making is obtained by mixing and indurating about 1 to about 20%, by weight of the pellet, of ground melt shop slag fines with similarly ground iron ore concentrate, so as to achieve particular ranges of silica content, $CaO/SiO_2$ ratio, and MgO content. The melt shop slag fines have been considered a waste material, but contain significant slag and metal values. The slag is already in calcined form for an energy saving as compared to the use of limestone and dolomite, and is already somewhat divided for a saving in grinding energy. The resultant basic pellets have better furnace properties than the acid pellet produced without slag addition.

7 Claims, No Drawings

BASIC PROCESS OF PRODUCING BASIC FLUXED PELLETS FOR IRON-MAKING

CROSS-REFERENCE TO RELATED APPLICATIONS

This application is a continuation-in-part of our application Ser. No. 91,430, filed Nov. 5, 1979, now abandoned.

FIELD OF THE INVENTION

The present invention is concerned with improvements in or relating to processes for the production of basic fluxed pellets for use in iron-making operations.

REVIEW OF THE PRIOR ART

It is now a common practice to beneficiate iron ore materials before their shipment from a mine site in order to provide a material suitable in its physical and chemical properties for charging directly into the blast furnace. Such beneficiation processes require that the ore be crushed and ground to permit separation of the iron-containing and non-iron-containing portions, and the iron-containing portion is then formed by any suitable process into pellets, usually of about 6–25 mm dimension, as being the most suitable form for transport and subsequent furnace charging.

It is also found to be advantageous to incorporate flux materials into the material to be pelletized while it is in the finely divided state, since the flux acts as a bonding agent, which is required in any case, and the intimate mixing of the flux and iron considerably improves the blast furnace operation. The pellets can be either acidic or basic in chemistry, depending on the composition of the slag additive. Hitherto acid pellets have been used most extensively and although basic pellets are known to have advantages over acid pellets of better reducability softening and melting properties, their development has been slower. One reason given for such slow development is that the limestone and dolomite addition employed requires so much heat for its calcination that the production capacity of the pelletizing plant is reduced, compared with when acid pellets are being made. Another factor is that it is unusual for limestone and dolomite to be readily available adjacent to iron-containing minerals, and these must be shipped to the site, while this is not the case with acid pellets.

DEFINITION OF THE INVENTION

It is therefore an object of the invention to provide a new process of producing basic fluxed pellet for iron-making.

It is a more specific object to provide a new process of producing fluxed pellet for iron-making in which the basic-causing addition has the calcium and/or magnesium thereof already in the calcined form of the oxide.

(A) iron-containing material;

(B) from 1 to 20% by weight of the pellet of melt shop slag fines containing calcium and magnesium in the pre-calcined form of oxide thereof;

(C) additional calcium and magnesium if required to provide a pellet in which:

(a) the silica content is from about 2.5 to about 7.0% by weight (b) the CaO/SiO$_2$ ratio is in the range 0.9 to 1.8, and (c) the MgO content is in the range of 1.0 to 2.5% by weight of the pellet.

In accordance with the present invention there is provided a process for the production of a basic fluxed pellet for iron-making operations, the process including:

(A) grinding an iron-containing material to at most about 45 microns in size.

(B) grinding melt shop slag fines containing calcium and magnesium in the pre-calcined form of oxide thereof to at most about 45 microns in size.

(C) mixing together the said iron-containing material and from 1 to 20% by weight of the resultant pellet of the said melt shop slag fines to provide a mixed material in which:

(a) the silica content is from about 2.5% to about 7.0% by weight, (b) the CaO/SiO$_2$ ratio is in the range 0.9 to 1.8, and (c) the MgO content is in the range of 1.0 to 2.5% by weight, and (D) indurating the mixed material to form discrete self-sustaining pellets.

Preferably the CaO/SiO$_2$ content is from 1.1 to 1.6 and more preferably it is 1.3, and preferably the MgO content is 1.5% by weight. Preferably 5 to 20% of fines are used.

We have discovered that satisfactory basic fluxed pellets suitable for charging directly into an iron-making furnace, e.g. a blast or electric furnace, can be produced by mixing together a major portion of iron-containing material, such as a beneficiated iron ore, with the specified proportions of melt shop slag fines, with or without the inclusion of additional calcium and magnesium, usually in the form respectively of limestone and dolomite, in order to achieve the specified pellet chemistry.

Melt shop slag fines is the material recovered from the melt shop of any dimension less than about 9 mm and hitherto has been considered a waste material. Yet they contain significant metal and slag values, as evidenced by the following typical analysis:

| | | |
|---|---|---|
| Al$_2$O$_3$ | 1.1% | |
| CaO | 41.3% | |
| Total Fe | 22.5% | |
| Metallic Fe | 7.8% | |
| K$_2$O | .38% | |
| MgO | 5.7% | 84.857% |
| Na$_2$O | .028% | |
| S | .091% | |
| SiO$_2$ | 12.3% | |
| TiO$_2$ | .4% | |
| Loss on ignition | 1.4% | |

The material contains both calcium and magnesium in precalcined forms, namely in the forms of the respective oxides thereof, so that the energy required for formation of these oxides in the resultant pellet is correspondingly reduced, as compared with a pellet incorporating the usual sources, namely limestone and dolomite, which require calcination. Moreover, the material is obtained in relatively finely divided form so that the amount of energy required for mechanical reduction to a size required for incorporation in the finished pellet is also reduced. A further advantage is that the chemistry of the material is such that it has significant binding properties when mixed with the iron-containing base material, and the required amount of added binding material is less than would otherwise be required.

Melt shop slag fines produced as the result of basic oxygen furnace operation typically have a high CaO/SiO$_2$ ratio of about 3.5:1 (3.35:1 in the example above).

Such a high ratio is undesirable in the blast or electric furnace and we require that the ratio in the finished pellet be within the range 0.9 to 1.8, preferably in the range 1.1 to 1.6, and particularly close to the value 1.3. It is found that if the ratio is less than 0.9 the pellets tend to swell in the furnace with consequent physical breakdown; the same effect is obtained if the ratio is much greater than 1.8 and the resultant interference with the gas flow causes undesirable rough furnace operation.

As described above the preferred magnesium oxide content is between 1.0% and 2.5% with a preferred value between 1.5% and 2%. If the proportion is less than 1% the pellet softening point is too low and low temperature breakdown takes place; their high temperature properties are poor and the pellets will not maintain sufficient individuality in the lower part of the furnace for free gas flow, resulting in an unacceptable increase in the pressure drop through the furnace, while no significant advantage is noted in increasing the proportion above 2.5%.

The silica content of the pellets is also significant, since with too small a proportion of silica, less than that specified, the pellets become mechanically weak and the slag volume that is obtained in the furnace is too low for the slag to perform its intended purpose. This value must be monitored particularly when the major part of the iron-containing material is a beneficiated ore, since the beneficiating process usually results in a low silica content (e.g. down to ½%) while removing potassium ($K_2O$), sodium ($Na_2O$) and phosphorous (P).

In a typical example the iron containing material was the beneficiated ore obtained from the Sherman Mine, Temagami, Province of Ontario, Canada. The ore as mined contains 19% magnetite iron with a total iron content of 22%, while the beneficiated ore contains 67% total iron. In the course of the process the material is ground until 90% will pass through a −325 mesh sieve, corresponding to a particulate size of less than about 45 microns. After separation of the iron-containing and non-iron- containing fractions the iron-containing portion is mixed with a small amount of binder, usually about 1% by weight of bentonite, balled in a balling drum, dried, preheated and finally indurated in a kiln. The pellets thus produced are about 12–13 mm diameter, the size being quite closely controlled, so that usually not more than 1% by weight are more than 16 mm diameter and not more than 2% by weight are less than 6.5 mm diameter.

In a process of this invention the melt shop slag fines are screened to remove those of greater than about 9.5 mm, since they can be used directly in the furnace, and the smaller material is shipped to the mine for grinding in the equipment thereof to a particle size corresponding to that of the ore concentrate i.e. less than about 45 microns. The finely divided materials are now mixed together with added finely divided limestone and dolomite as necessary to obtain a pellet of the desired chemistry, depending upon the quantity of fines that are available. Table 1 below shows the added amounts of limestone and dolomite that are required for different available quantities of fines of the composition given about to achieve a pellet in which the $CaO/SiO_2$ ratio is about 1.3, and the MgO value is about 1.5%.

TABLE I

| % fines | % limestone | % dolomite |
|---|---|---|
| 5 | 6.6 | 4.2 |
| 10 | 4.8 | 3.0 |
| 15 | 2.8 | 1.7 |
| 20 | 1.0 | 0.5 |

All of these pellets incorporate about 1% by weight of bentonite as a binder. In the absence of either added limestone and/ or dolomite an acid unfluxed pellet would result. In the complete absence of added fines 8.5% of limestone and 5.5% of dolomite would be required to obtain a basic fluxed pellet of the required chemistry. It may be noted that the addition of the flux to the pellets does reduce the proportion of iron content, but this is amply compensated by the improved performance obtained, as will be described below. The mixture is now formed into pellets using the available equipment for that purpose, the pellets being of the specified dimensions.

Indurating is in itself a well-known process and usually involves the four steps:
 (a) Drying
 (b) Preheating to avoid thermal shock
 (c) Firing
 (d) Cooling to an acceptable handling temperature.

Suitable drying steps for example make use of heated gases in the temperature range 280° C.–510° C. (550° F.–950° F.) to result in product temperatures in the range 100° C.–510° C. (212° F.–950° F.), while preheating steps involve for example the use of gases of temperature in the range 980° C.–1315° C. (1800° F.–2400° F.) to result in product temperatures in the range 870° C.–1315° C. (1600° F.–2400° F.). An example of a satisfactory firing step in a rotary kiln is one occupying about 25 minutes; during the first twelve minutes the temperature of the product is raised to a maximum value usually about 1480° C. (2700° F.); this maximum value is then maintained during about the next eight minutes; at the end of the high temperature period about five minutes is taken to reduce the product temperature to about 870° C. (1600° F.). Thereafter the product is cooled to a suitable handling temperature of about 26° C.–50° C. (80° F.–120° F.). Variations in the parameters required for a particular process will be apparent to those skilled in the art. A grate can, of course, be used instead of a kiln.

The evaluation of a pellet's suitability for use in a furnace is complex owing to the different requirements while being made and transported, and the different requirements for satisfactory performance in the furnace. The steel industry is essentially highly cost conscious in all phases of its operation, and especially for such a basic component as the furnace charge. The pellets must be sufficiently strong to withstand handling and to test this are subjected to tumble tests and to tests of their compressive strength. They must not swell too much or otherwise breakdown in the furnace, particularly at the temperatures prevailing at the top end thereof (400°–600° C.), and yet they must be sufficiently porous for the chemical reaction to proceed readily. The fluxed pellets of the invention can be made to meet these requirements and it has been found that highly acceptable pellets are made with from 1–20% by weight of the added fines. A particularly satisfactory pellet is made with 15% by weight of fines. More than 20% are not normally required since, as will be seen from Table 1 there is no need for additional CaO or MgO, and in fact at these values some low temperature breakdown of the pellets begins to be observed.

The mill scale resulting from typical iron and steel mill operations is also a useful source of iron values, and the material available can be ground to the necessary degree of fineness and mixed into the material mixture from which the pellets are produced. Typically a mill scale will include about 70 to about 90% by weight of total iron, so that its addition primarily increases the iron content of the pellet. The amount of mill scale available as compared with the weight of iron ore required will usually limit the amount that can be included in the pellets to less than about 10% by weight.

The use of fluxed pellets in an iron-making furnace permits the use of a higher tuyere raceway flame temperature, since the pellets maintain their individually at this higher temperature and therefore do not inhibit the flow of gas in the blast furnace. Because much of the flux is already in the calcined state the total fuel requirement and the specific wind per tonne of pig iron are reduced. In a specific example the specific wind requirement was reduced from 1235.6 normal cubic meters per metric ton of iron (46,000 standard cubic feet per ton) to 967.0 normal cubic meters per metric ton (36,000 standard cubic feet per ton) giving the possibility of increasing the output of the furnace by 20%.

The embodiments of the invention in which an exclusive property or privilege is claimed are defined as follows:

1. A process for the production of a basic fluxed pellet for iron-making operations, the process including:

(A) grinding an iron-containing material to at most about 45 microns in size;
   (B) grinding melt shop slag fines containing calcium and magnesium in the pre-calcined form of oxide thereof to at most about 45 microns in size;
   (C) mixing together the said iron-containing material and from 1 to 20% by weight of the resultant pellet of the said melt shop slag fines to provide a mixed material in which:
   (a) the silica content is from about 2.5% to about 7.0% by weight,
   (b) the $CaO/SiO_2$ ratio is in the range 0.9 to 1.8,
   (c) the MgO content is in the range of 1.0 to 2.5% by weight, and
   (D) indurating the mixed material to form discrete self-sustaining pellets.

2. A process as claimed in claim 1, wherein the $CaO/SiO_2$ ratio is 1.1 to 1.6.

3. A process as claimed in claim 2, wherein the $CaO/SiO_2$ ratio is 1.3.

4. A process as claimed in any one of claims 1 to 3, wherein the MgO content is 1.5% by weight.

5. A process as claimed in any one of claims 1 to 3, wherein the resultant pellet contains from 5 to 20% by weight of the melt shop slag fines.

6. A process as claimed in any one of claims 1 to 3, and including mixing with the said mixed material up to about 10% by weight of mill scale ground to at most about 45 microns in size.

7. A process as claimed in any one of claims 1 to 3, including mixing with the said mixed material additional ground limestone and dolomite to obtain the required pellet chemistry.

* * * * *